(12) United States Patent
Hsu

(10) Patent No.: US 7,747,883 B2
(45) Date of Patent: *Jun. 29, 2010

(54) COMPUTER SYSTEM WITH NON-SUPPORT HYPER-TRANSPORT PROCESSOR AND CONTROLLING METHOD OF HYPER-TRANSPORT BUS THEREOF

(75) Inventor: Ming-Wei Hsu, Taipei (TW)

(73) Assignee: Via Technologies, Inc., Hsin-Tien, Taipei (TW)

( * ) Notice: Subject to any disclaimer, the term of this patent is extended or adjusted under 35 U.S.C. 154(b) by 732 days.

This patent is subject to a terminal disclaimer.

(21) Appl. No.: 11/681,917

(22) Filed: Mar. 5, 2007

(65) Prior Publication Data

US 2007/0234082 A1 Oct. 4, 2007

(30) Foreign Application Priority Data

Mar. 29, 2006 (TW) .............................. 95111045 A

(51) Int. Cl.
- G06F 1/00 (2006.01)
- G06F 9/00 (2006.01)
- G06F 13/00 (2006.01)
- G06F 13/42 (2006.01)
- G06F 13/36 (2006.01)

(52) U.S. Cl. ........................ 713/300; 713/1; 713/100; 710/104; 710/105; 710/306; 710/316

(58) Field of Classification Search ................. 713/300, 713/1, 100; 710/104, 105, 306, 316
See application file for complete search history.

(56) References Cited

U.S. PATENT DOCUMENTS

| 7,073,082 | B2 * | 7/2006 | Hsu ........................... 713/323 |
| 7,076,674 | B2 * | 7/2006 | Cervantes ................... 713/310 |
| 7,278,033 | B2 * | 10/2007 | Mylly ......................... 713/300 |
| 7,363,408 | B2 * | 4/2008 | Ho et al. ..................... 710/260 |
| 7,487,371 | B2 * | 2/2009 | Simeral et al. .............. 713/300 |

\* cited by examiner

Primary Examiner—Stefan Stoynov
(74) Attorney, Agent, or Firm—Thomas, Kayden, Horstemeyer & Risley

(57) ABSTRACT

A computer system with a non-support hyper-transport processor and a controlling method of a hyper-transport bus thereof. The computer system includes a system management controller, a Northbridge, a hyper-transport bus, a central processing unit and a power management signal line. The Northbridge is electrically connected to the system management controller through the hyper-transport bus. The central processing unit is electrically connected to the Northbridge, and the central processing unit does not support the hyper-transport bus. The system management controller outputs a power management signal to the central processing unit and the Northbridge through the power management signal line so that the hyper-transport bus changes from a first working frequency to a second working frequency, and from a first bus width to a second bus width.

20 Claims, 3 Drawing Sheets

COMPUTER SYSTEM WITH NON-SUPPORT HYPER-TRANSPORT PROCESSOR AND CONTROLLING METHOD OF HYPER-TRANSPORT BUS THEREOF

This application claims the benefit of Taiwan application Serial No. 95111045, filed Mar. 29, 2006, the subject matter of which is incorporated herein by reference.

BACKGROUND OF THE INVENTION

1. Field of the Invention

The invention relates in general to a computer system with a hyper-transport bus, and more particularly to a computer system having a hyper-transport bus and a non-support hyper-transport processor, and a controlling method of the hyper-transport bus.

2. Description of the Related Art

A computer system is mainly composed of an input unit, an output unit, a control unit, a memory unit and an arithmetic logic unit, wherein data are transmitted between the units through a bus so that the efficiency of the computer system may be enhanced.

Buses may be classified into a data bus, an address bus, a control bus, an expansion bus and a local bus. The transmission capability of the bus depends on a bandwidth of the bus, which is equal to a bus width multiplied by a working frequency. The working frequency is also referred to as a bus speed. For example, if the bus width is 8 bits or 16 bits, it means that the bus can transmit 8 bits or 16 bits of data at a time. The working frequency takes a clock as an operation unit. If the working frequency is 100 MHz and the bus width is 8 bits, it represents that the data can be transmitted at the speed of 100 MB per second. Similarly, if the bus width is 16 bits, it represents that the data can be transmitted at the speed of 200 MB per second.

However, the typical processor transmits data at the lower working frequency and the lower bus width during the booting procedure. If the working frequency and the bus width have to be increased, the computer system needs more signal lines to transmit the control signals to change the working frequency and the bus width. If the number of signal lines is increased, the electromagnetic interference between the signal lines tends to generate. In addition, the complexity of the circuit layout is increased with plenty of signal lines deposited on a printed circuit board (PCB).

SUMMARY OF THE INVENTION

The invention is directed to a computer system and a controlling method of a hyper-transport bus. The computer system has a central processing unit, a Northbridge and a system management controller, all of which are electrically connected to one power management signal line. The system management controller outputs a power management signal to the Northbridge and the central processing unit through the power management signal line so that the hyper-transport bus changes from a first working frequency to a second working frequency, and from a first bus width to a second bus width. Thus, the hyper-transport bus can be optimized.

According to a first aspect of the present invention, a computer system is provided. The computer system includes a system management controller, a Northbridge, a hyper-transport bus, a central processing unit and a power management signal line. The Northbridge is electrically connected to the system management controller through the hyper-transport bus. The central processing unit is electrically connected to the Northbridge, and the central processing unit does not support the hyper-transport bus. The system management controller outputs the power management signal to the central processing unit and the Northbridge through the power management signal line so that the hyper-transport bus changes from a first working frequency to a second working frequency, and the hyper-transport bus changes from a first bus width to a second bus width.

According to a second aspect of the present invention, a power management method of a hyper-transport bus is provided. The power management method of the hyper-transport bus is applied to a computer system, and the computer system includes a system management controller, a Northbridge, a hyper-transport bus and a central processing unit. The central processing unit is electrically connected to the Northbridge and the central processing unit does not support the hyper-transport bus technology. The Northbridge is electrically connected to the system management controller through the hyper-transport bus.

The power management method of the hyper-transport bus includes the following steps. First, a power management signal line is provided. Next, the system management controller enables the power management signal. Finally, the power management signal is outputted to the central processing unit and the Northbridge through the power management signal line so that the hyper-transport bus changes from a first working frequency to a second working frequency and from a first bus width to a second bus width.

The invention will become apparent from the following detailed description of the preferred but non-limiting embodiments. The following description is made with reference to the accompanying drawings.

DETAILED DESCRIPTION OF THE INVENTION

During a booting procedure, a hyper-transport bus transmits data with a specified first working frequency and a specified first bus width. If the working frequency and the bus width of the hyper-transport bus have to be increased, a system management controller has to assert a signal to a Northbridge, and the signal is outputted and then recovered. When the signal is recovered, the hyper-transport bus transmits the data again with a second working frequency and a second bus width according to a predefined value in a register of the system management controller.

The system management controller asserts a power management signal when a central processing unit enters a power-saving state C3. So, the power management signal may be simultaneously outputted to the Northbridge and the central processing unit and the system management controller is caused to recover the power management signal after a predetermined time. Consequently, the hyper-transport bus can change from the lower first working frequency to the higher second working frequency and from the first bus width to the second bus width, so that the data transmission of the hyper-transport bus can be optimized.

Figure 1:
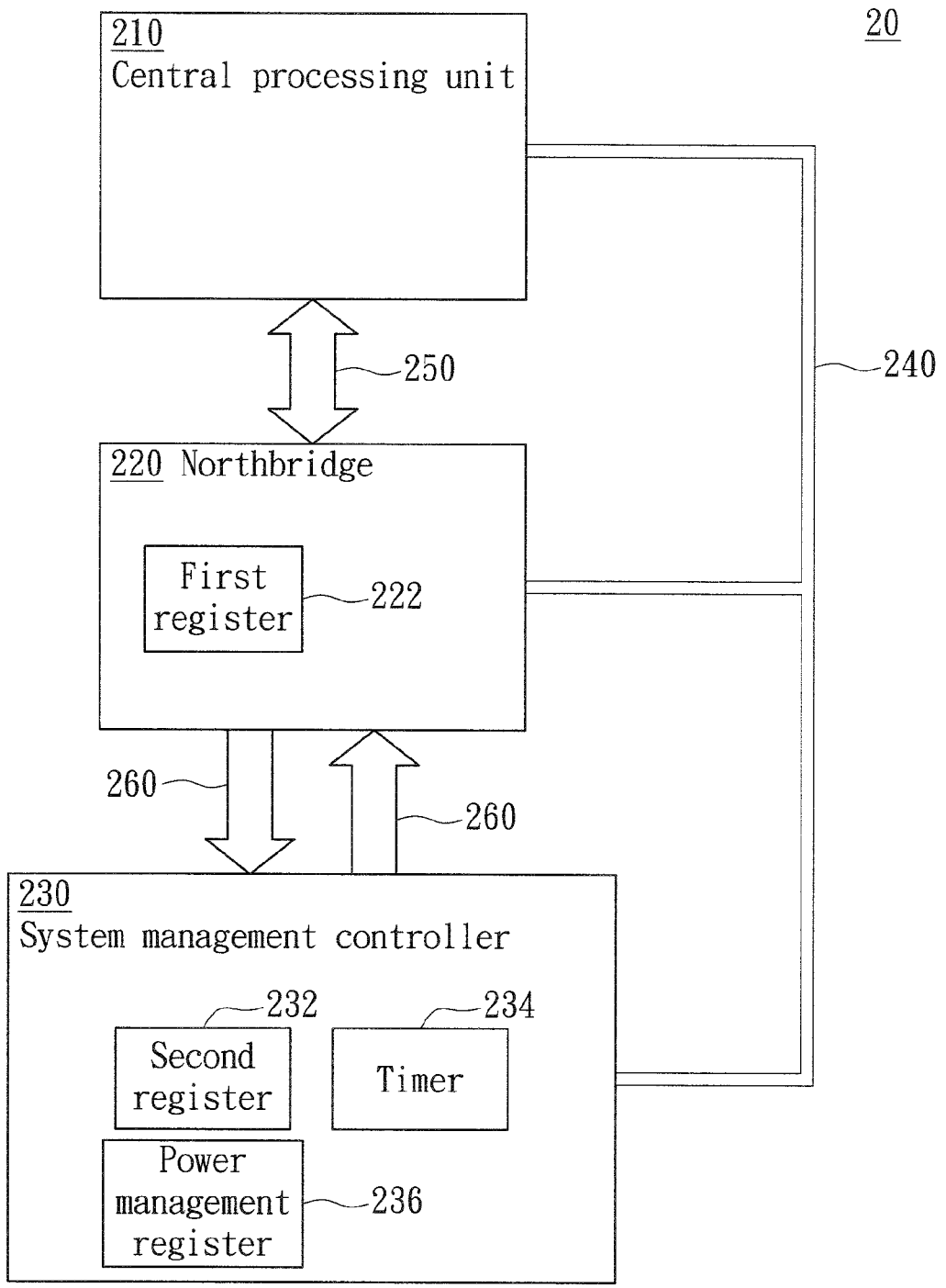
FIG. 1 is a block diagram showing a computer system according to a preferred embodiment of the invention.

FIG. 1 is a block diagram showing a computer system 20 according to a preferred embodiment of the invention. Referring to FIG. 1, the computer system 20 includes a central processing unit 210, a Northbridge 220, a system management controller (SMC) 230, a power management signal line 240, a host bus 250 and a hyper-transport bus 260. The SMC 230 may be, for example, a Southbridge, and the power management signal line 240 transmits the power management signals including a sleep signal SLP#. The central processing unit 210, such as the Intel P4, AMD K7 or Celeron processor, does not support the hyper-transport bus.

Because the Intel Pentium series processor, the AMD K7 series processor or the Celeron series processor does not support the hyper-transport bus architecture, the host bus 250 is not a hyper-transport bus in this embodiment.

In this computer system 20, the host bus 250 between the central processing unit 210 and the Northbridge 220 is not the hyper-transport bus, and the data is transmitted between the Northbridge 220 and the SMC 230 through the hyper-transport bus 260. So, this architecture is not used in the prior art.

The central processing unit 210 and the Northbridge 220 are electrically connected to the host bus 250 so that the data can be transmitted to and from the host bus 250. The Northbridge 220 and the SMC 230 are electrically connected to the hyper-transport bus 260 so as to transmit the data through the hyper-transport bus 260 in the data transmission state. The power management signal line 240 is electrically connected to the central processing unit 210, the Northbridge 220 and the SMC 230.

In detail, the Northbridge 220 further includes a first register 222, and the SMC 230 further includes a second register 232, a timer 234 and a power management I/O register 236. The timer 234, such as an auto recovery timer, counts a predetermined time. The first register 222, the second register 232 and the power management I/O register 236 store a predefined value.

When the computer system 20 is booted, the hyper-transport bus 260 transmits the data with the first working frequency, such as 200 MHz, and the first bus width, such as 8 bits.

When the working frequency and the bus width of the hyper-transport bus 260 have to be increased, the computer system 20 changes the predefined values of the first register 222 and the second register 232, and drives the SMC 230, through the operation system, to read the power management I/O (PMIO) register 236 to assert the sleep signal SLP# while the timer 234 starts to count the time.

The SMC 230 asserts the sleep signal SLP# to the central processing unit 210 and the Northbridge 220, and then the working state of the central processing unit 210 changes from the normal state C0 to the lowest power-saving state C3 so that the power consumption of the central processing unit 210 can be reduced. The computer system 20 disconnects the hyper-transport bus 260 after asserting the power management signal.

After the timer 234 has counted at a predetermined time, the SMC 230 de-asserts the sleep signal SLP# so that the hyper-transport bus 260 is reconnected after the central processing unit 210 de-asserts the power management signal, and transmits the data with the second working frequency and the second bus width according to the changed predefined values in the first register 222 and the second register 232. That is, the hyper-transport bus 260 recovers the normal state C0 from the power-saving state C3 so that various works may be performed. The second working frequency may be, for example, 400 MHz, 600 MHz, 800 Mh or 1 GHz, and the second bus width may be, for example, 16 bits. The hyper-transport bus 260 can transmit the data with the higher working frequency and the wider bus width so that the hyper-transport bus 260 can be optimized.

Figure 2:
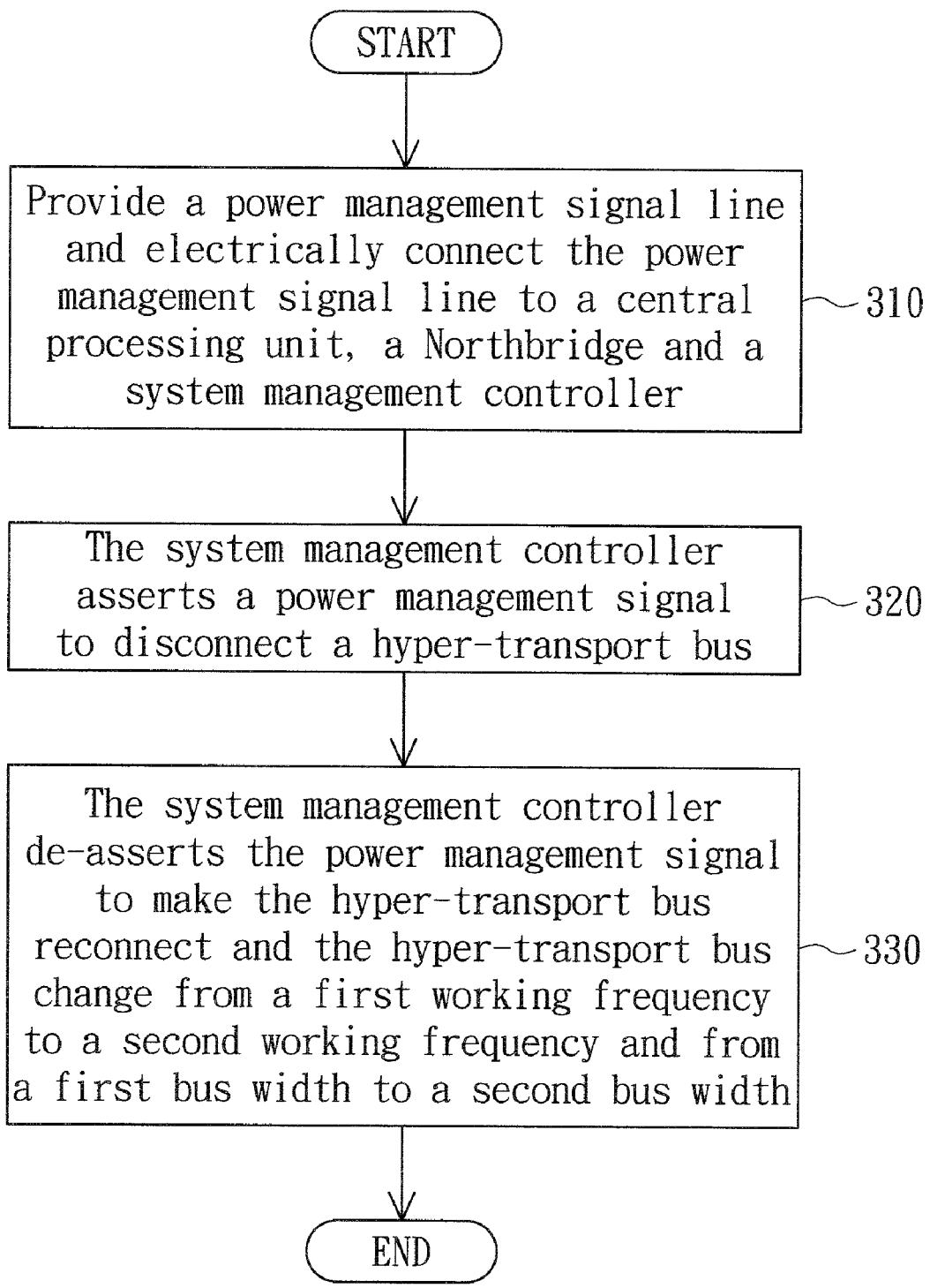
FIG. 2 is a flow chart showing a controlling method of a hyper-transport bus according to a preferred embodiment of the invention.

FIG. 2 is a flow chart showing a controlling method of a hyper-transport bus according to a preferred embodiment of the invention. Referring to FIG. 2, the controlling method of the hyper-transport bus includes the following steps. First, as shown in step 310, the power management signal line 240, such as the signal line SLP#, is provided, and the power management signal line 240 is electrically connected to the central processing unit 210, the Northbridge 220 and the SMC 230.

Next, as shown in step 320, the SMC 230 asserts the power management signal to the central processing unit 210 and the Northbridge 220 through the power management signal line 240 to disconnect the hyper-transport bus 260.

Finally, as shown in step 330, the SMC 230 de-asserts the power management signal to reconnect the hyper-transport bus 260 and enable the hyper-transport bus 260 to change from the first working frequency to the second working frequency and from the first bus width to the second bus width.

Figure 3:
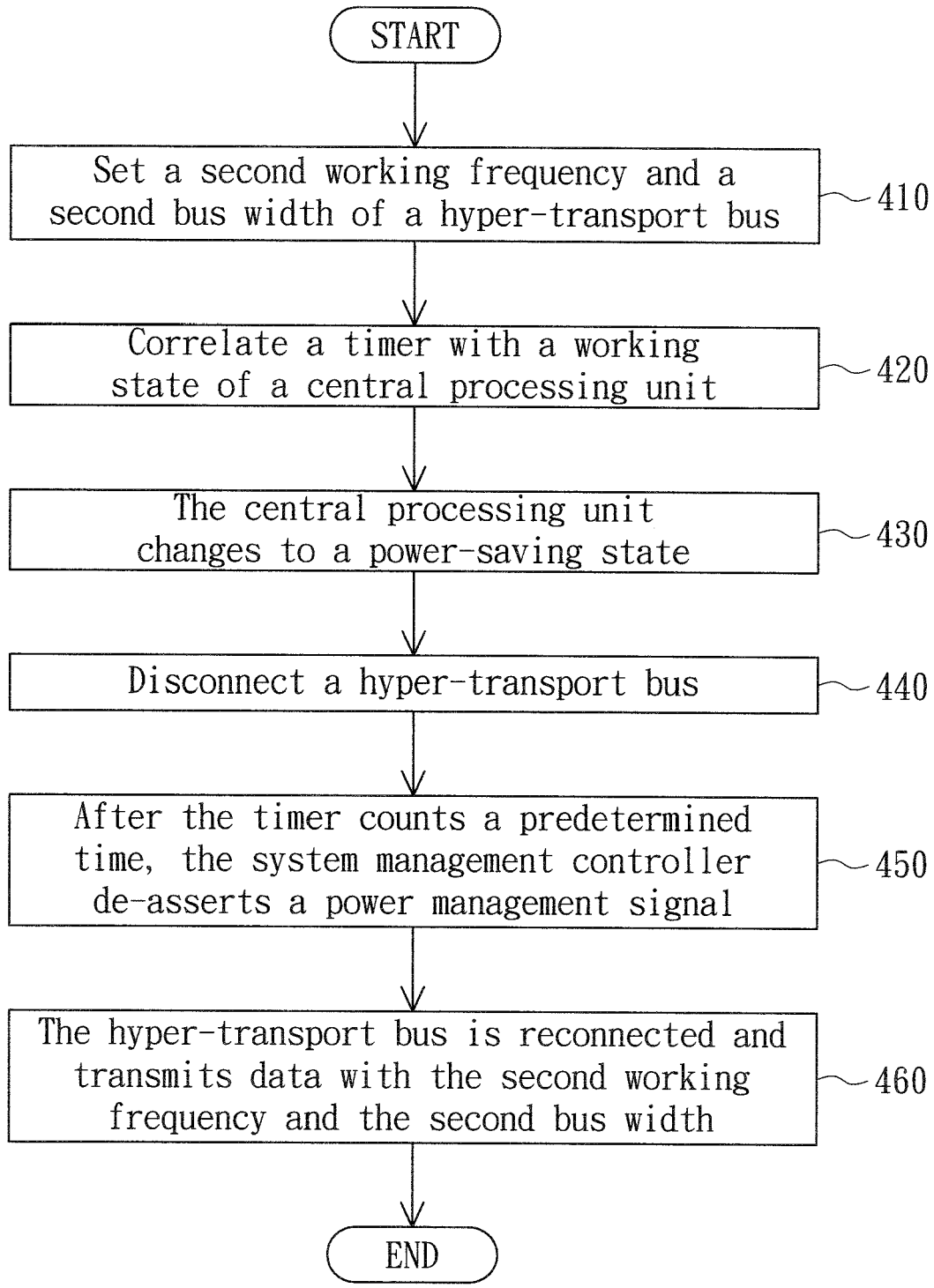
FIG. 3 is a flow chart showing details of optimizing the hyper-transport bus.

FIG. 3 is a flow chart showing details of optimizing the hyper-transport bus. Referring to FIG. 3, the detailed flow of optimizing the hyper-transport bus 260 includes the following steps.

First, as shown in step 410, the second working frequency and the second bus width of the hyper-transport bus 260 are set in the first register 222 and the second register 232, respectively, wherein the second working frequency is set as 1 GHz and the second bus width is set as 16 bits, for example.

Next, as shown in step 420, the timer 234 is correlated with the working state of the central processing unit 210. For example, an auto resume timer register in the SMC 230 is enabled so that the timer 234 starts to count at the time when the central processing unit 210 changes to the power-saving state C3.

Next, as shown in step 430, the central processing unit 210 is caused to change to the power-saving state C3. For example, the advanced configuration & power interface (ACPI) specifies that the central processing unit 210 can correspondingly change to the power-saving state C3 when reading the power management I/O register.

Next, as shown in step 440, the hyper-transport bus 260 is disconnected, and the timer 234 starts to count at the time. Because the SMC 230 asserts the power management signal and outputs the power management signal to the Northbridge 220 and the central processing unit 210, the data transmission state of the hyper-transport bus 260 is interrupted when the central processing unit 210 changes to the power-saving state C3.

Next, as shown in step 450, after the timer 234 has counted at a predetermined time, the SMC 230 de-asserts the power management signal.

Then, as shown in step 460, the central processing unit 210 returns to the normal state C0 from the power-saving state C3, and the hyper-transport bus 260 is reconnected for transmitting the data with the second working frequency and the second bus width.

As for the buses for the Northbridge and the Southbridge in a computer system, the bandwidths of the buses connected to the Northbridge and the Southbridge depend on the external peripheral device, such as a keyboard, a mouse, a floppy disk drive, a hard disk drive or a printer. Because the high speed I/O peripheral devices continuously become the standard components, such as a Serial-ATA, a universal serial bus (USB) and a fire wire (IEEE1394 or Firewire), in the computer system, the old bus specifications cannot satisfy the requirements. Thus, the manufacturer has proposed a hyper-transport bus to transmit the data between the Northbridge and the Southbridge at a higher transmission rate.

The hyper-transport bus described in the specification is proposed by AMD and is characterized in transferring data between the integrated circuits with high speed via point-to-point interconnections so that two unidirectional connections (transmission and reception) are adopted when two chips are connected together, and a daisy chain connection is adopted when multiple elements are connected together. So, the functional modules can be increased without limitation.

The hyper-transport bus supports high speed serial connection functions with the bandwidths of 4 bits, 8 bits, 16 bits and 32 bits so that the synchronous clock frequency of each lead may be changed, and provides the bandwidth of 12.8 GB/second so that the highest transmission speed may be selected according to the requirement and the processing ability of the computer system. Thus, a good choice between the manufacture cost and the performance speed can be determined.

It is to be specified that the hyper-transport bus is not limited to the transmission method between the Southbridge and the Northbridge, but is suitable for any signal transmission between modules in the computer system. The hyper-transport bus is mainly developed according to the high bandwidth apparatuses such as the memory controller, the hard drive controller and the PCI bus controller. The hyper-transport bus adjusts its working frequency and bit width according to the specification of the transmission apparatus. The hyper-transport bus may implement the double data transmission rate. Table 1 shows the data transmission rate of the hyper-transport bus under 400 MHz and 800 Mhz.

TABLE 1

| 400 MHz hyper-transport bus | |
| --- | --- |
| bi-directional 4-bit mode | 0.8 GB/s |
| bi-directional 8-bit mode | 1.6 GB/s |
| 800 MHz hyper-transport bus | |
| bi-directional 8-bit mode | 3.2 GB/s |
| bi-directional 16-bit mode | 6.4 GB/s |
| bi-directional 32-bit mode | 12.8 |

In the computer system and the controlling method for the hyper-transport bus thereof according to the embodiments of the invention, the system management controller is electrically connected to the Northbridge and the central processing unit through the power management signal line so that the power management signal is outputted to the Northbridge and the central processing unit. When the system management controller wants to make the central processing unit enter the power-saving state, the data transmission state of the hyper-transport bus can be disconnected and the data can be transmitted with the higher working frequency and the wider bus width after a predetermined time. Thus, the hyper-transport bus can be optimized.

In addition, because the same power management signal line is electrically connected to the Northbridge and the central processing unit, the electromagnetic interference between different power management signal lines can be avoided.

In addition, because the Northbridge and the central processing unit receives the power management signal through the same power management signal line, the complexity of the circuit layout will be decreased when the circuit layout for the power management signal line is formed on the printed circuit board (PCB).

Similarly, because the same power management signal line is electrically connected to the Northbridge and the central processing unit, the number of pins of the system management controller is correspondingly decreased so that the size of the system management controller is correspondingly reduced.

While the invention has been described by way of examples and in terms of preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A computer system, comprising:
   a system management controller (SMC);
   a Northbridge;
   a hyper-transport bus, wherein the Northbridge is electrically connected to the system management controller through the hyper-transport bus;
   a central processing unit (CPU), which is electrically connected to the Northbridge through a host bus, which supports standard bus except the hyper-transport bus; and
   a power management signal line for outputting a power management signal into the central processing unit and the Northbridge through the power management signal line to enable the hyper-transport bus to change from a first working frequency to a second working frequency and from a first bus width to a second bus width.

2. The system according to claim 1, wherein the system management controller asserts the power management signal to enable the central processing unit to enter a power-saving state from a working power state and to disconnect the hyper-transport bus.

3. The system according to claim 2, wherein the working power state is a power state C0.

4. The system according to claim 2, wherein the power-saving state is a power state C3.

5. The system according to claim 1, wherein the hyper-transport bus is reconnected, changing from the first working frequency to the second working frequency, and from the first bus width to the second bus width when the system management controller de-asserts the power management signal.

6. The system according to claim 5, wherein the system management controller comprises a timer for counting at a predetermined time, and the system management controller de-asserts the power management signal after the predetermined time.

7. The system according to claim 1, wherein the power management signal line is a signal line SLP#.

8. The system according to claim 1, wherein the second working frequency is higher than the first working frequency and the second bus width is greater than the first bus width.

9. The system according to claim 1, wherein the central processing unit is a Pentium processor.

10. The system according to claim 1, wherein the central processing unit is a K7 processor.

11. The system according to claim 1, wherein the central processing unit is a Celeron processor.

12. A controlling method for a hyper-transport bus being used in a computer system, which comprises a system management controller, a Northbridge, the hyper-transport bus and a central processing unit, wherein the central processing unit is electrically connected to the Northbridge through a host bus, which supports standard bus except the hyper-transport bus, the Northbridge is electrically connected to the system management controller through the hyper-transport bus, and the controlling method comprising the steps of:

providing a power management signal line;

enabling the system management controller to assert a power management signal to the central processing unit and the Northbridge through the power management signal line and the hyper-transport bus is disconnected; and de-asserting the power management signal via the system management controller to enable the hyper-transport bus to reconnect, to change from a first working frequency to a second working frequency and to change from a first bus width to a second bus width.

13. The method according to claim 12, wherein when enabling the system management controller to assert the power management signal, the system management controller asserts the power management signal to enable the hyper-transport bus to disconnect and to enable the central processing unit to enter a power-saving state from a working power state.

14. The method according to claim 13, wherein when the system management controller de-asserts the power management signal, the hyper-transport bus recovers a data transmission state, and the central processing unit returns to the working power state from the power-saving state to enable the hyper-transport bus to change from the first working frequency to the second working frequency, and from the first bus width to the second bus width.

15. The method according to claim 13, wherein the working power state is a power state C0.

16. The method according to claim 13, wherein the power-saving state is a power state C3.

17. The method according to claim 12, wherein the power management signal line is a signal line SLP#.

18. The method according to claim 12, wherein the central processing unit is a Pentium processor.

19. The method according to claim 12, wherein the central processing unit is a K7 processor.

20. The method according to claim 12, wherein the central processing unit is a Celeron processor.

* * * * *